H. G. DORSEY.
TELEGRAPHY.
APPLICATION FILED OCT. 6, 1916.
1,398,892.
Patented Nov. 29, 1921.
5 SHEETS—SHEET 3.
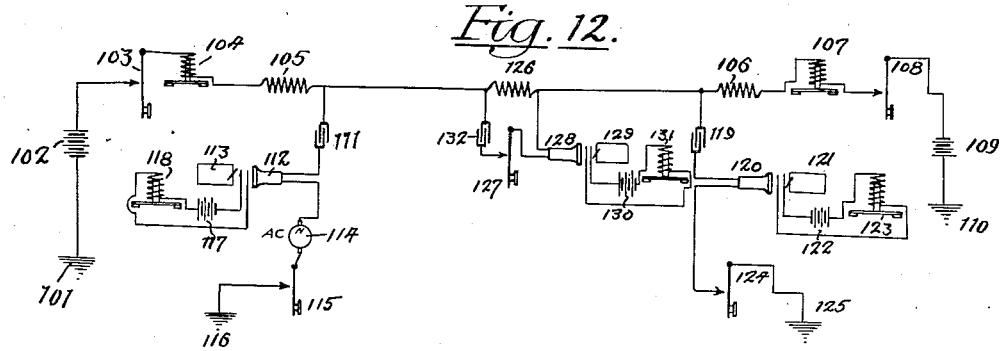
Fig. 12.
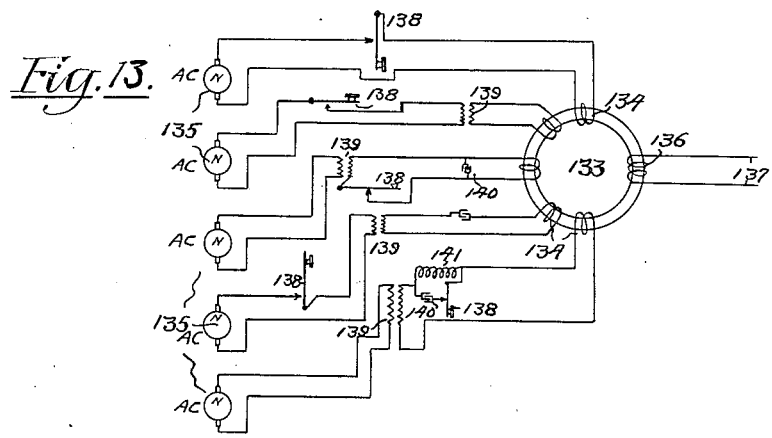
Fig. 13.
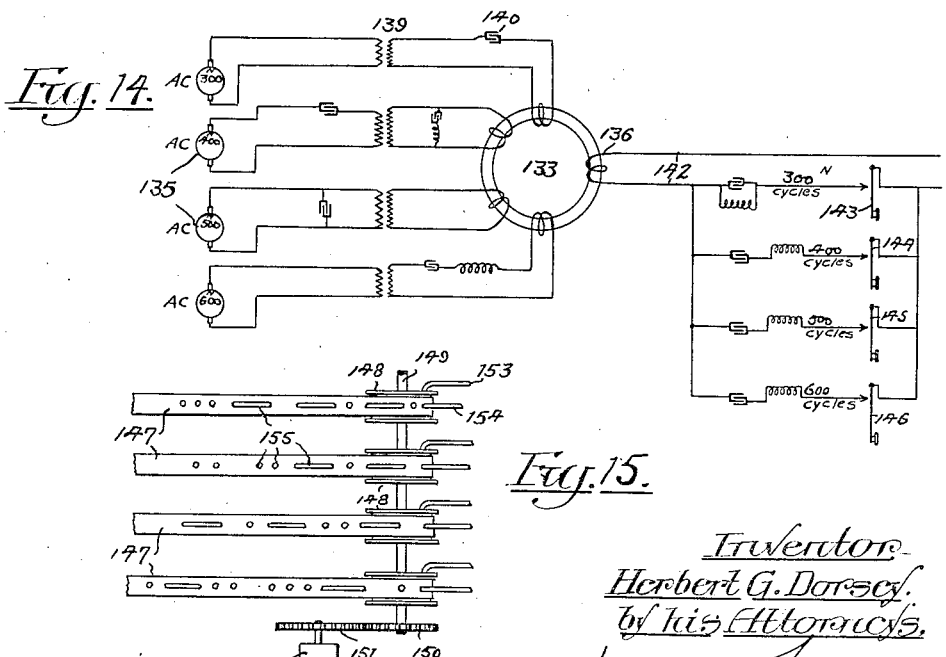
Fig. 14.
Fig. 15.
Inventor
Herbert G. Dorsey
by his Attorneys

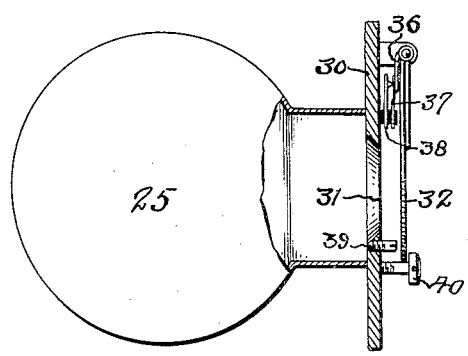
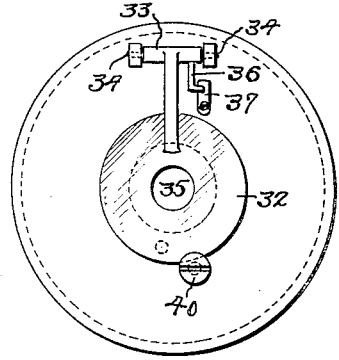
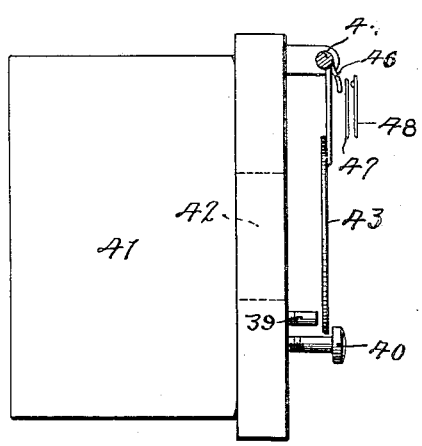
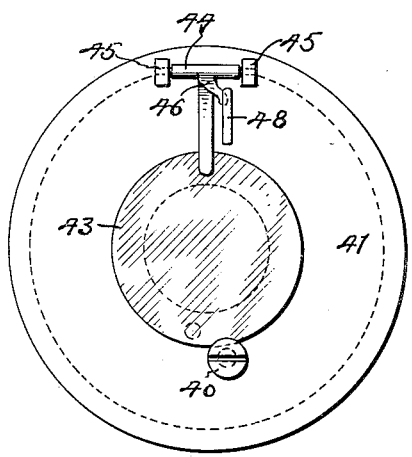
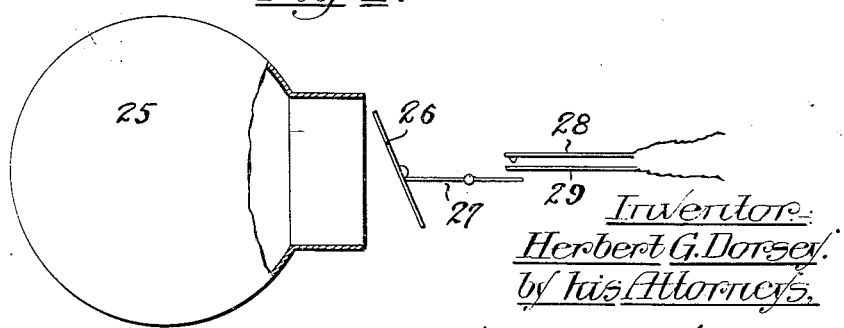

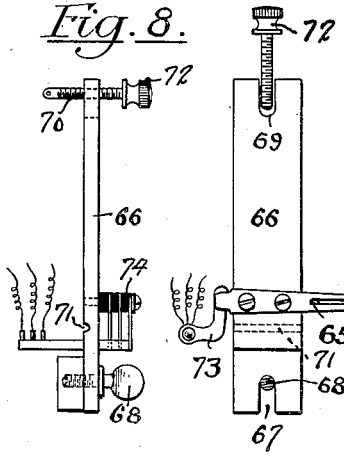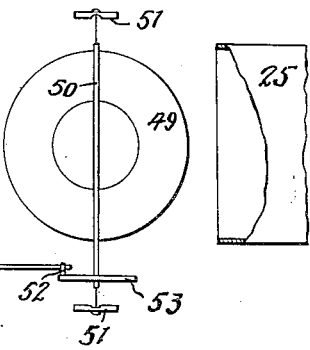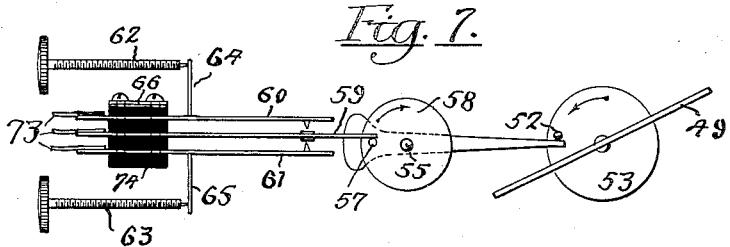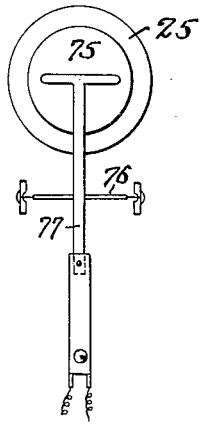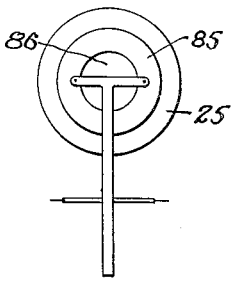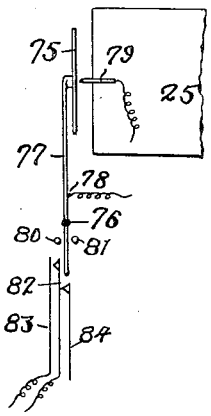

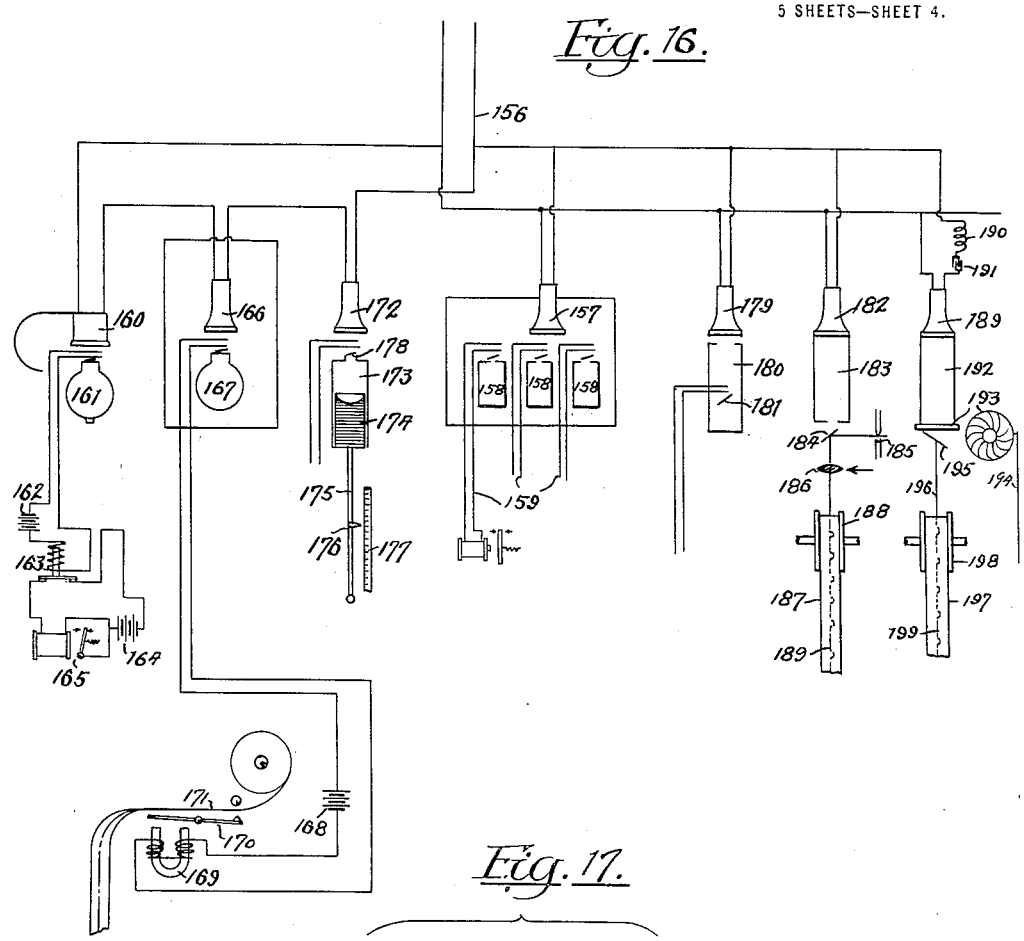
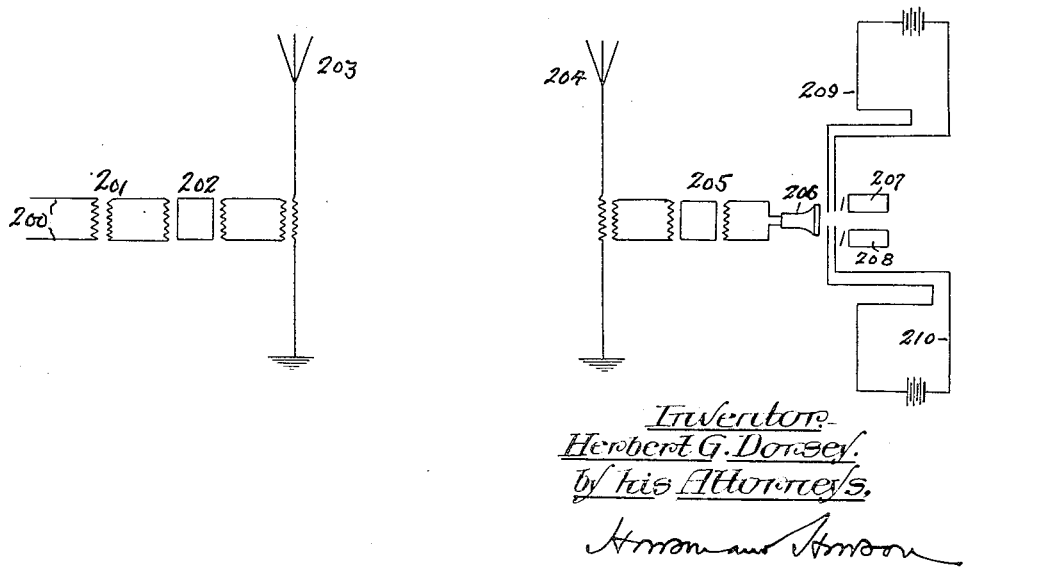

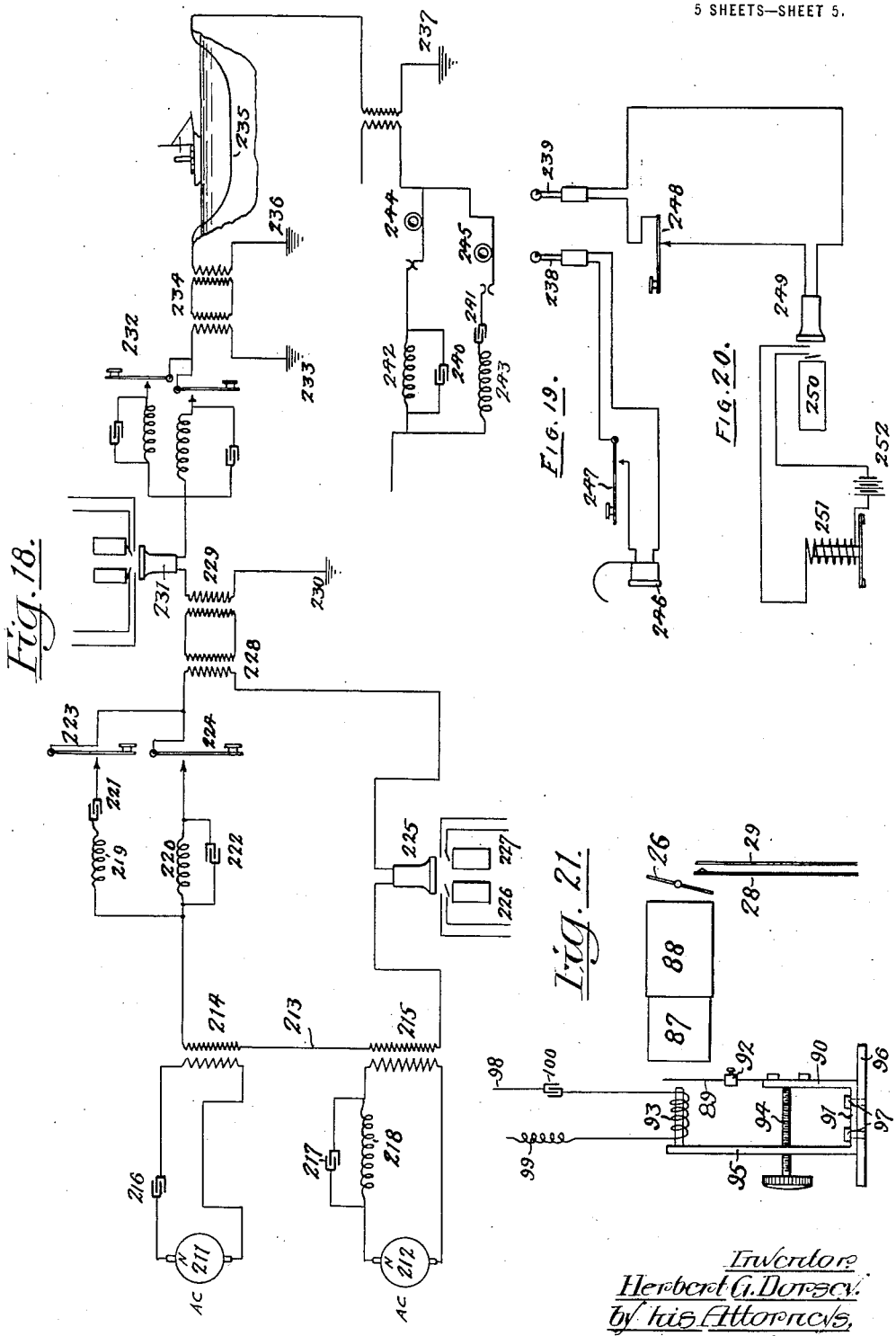

UNITED STATES PATENT OFFICE.

HERBERT G. DORSEY, OF GRANVILLE, OHIO.

TELEGRAPHY.

1,398,892.   Specification of Letters Patent.   Patented Nov. 29, 1921.

Application filed October 6, 1916. Serial No. 124,106.

*To all whom it may concern:*

Be it known that I, HERBERT G. DORSEY, a citizen of the United States of America, and residing at Granville, in the county of Licking and State of Ohio, have invented a certain new and useful Improvement in Telegraphy, of which the following is a specification.

My invention relates to telegraphy and particularly to multiple telegraphy. The particular object of my invention is to embody in a telegraphic system a device responsive to sound vibrations by which results not heretofore attained in the telegraphic art, are secured.

Referring to the accompanying drawings in which various illustrative embodiments of my invention are shown, Figure 1 is a broken side elevation of a resonator switch device which may be employed in the utilization of my invention;

Figs. 2 and 3 are broken side elevations and end elevation respectively of a modified resonator switch construction;

Figs. 4 and 5 are side elevation and end elevation respectively of a modified sound-operated switch mechanism;

Figs. 6, 7 and 8 are respectively plan, side and end elevation of a further modified resonator switch construction of peculiar sensitivity;

Figs. 9 and 10 are side and end elevations of a further modified form of resonator switch;

Fig. 11 is an end elevation of a modified switch diaphragm;

Fig. 12 is a diagrammatic illustration of a telegraphic system in which my invention is embodied;

Figs. 13 and 14 are diagrams of different types of sending stations;

Fig. 15 is a plan of a multiple automatic despatching apparatus;

Fig. 16 is a diagram of a receiving station showing various modified forms of receiving apparatus;

Fig. 17 is a diagram showing my invention associated with a wireless station;

Fig. 18 is a diagram of a system showing therein still another utilization of my invention;

Figs. 19 and 20 are diagrams of independent receiving systems adapted to be connected to the system of Fig. 18 by attachment plug connections; and Fig. 21 is a side elevation of a modified sound-producing device.

The basis of the present invention is the application to telegraphy and of the utilization in a telegraphic system of a physical displacement of parts resulting from the subjection of said parts to the influence of sound vibrations. This displacement may be effected in various ways and it may be utilized in various ways in a telegraphic system.

The action to which I have reference may be briefly explained by reference to Fig. 1. The mechanism shown in this figure comprises a Helmholtz resonator 25 combined with a Rayleigh disk or shutter 26. As Helmholtz discovered, the air in a bubble-like container such as 25 will respond to and reinforce sound waves of certain predetermined frequency, and no other. Lord Rayleigh in his "*Theory of Sound*," Vol. 2, page 44 (second edition) shows that a light thin disk or shutter 26 pivoted on a transverse axis at the mouth of a Helmholtz resonator and lying at an angle of about 45 degrees to the axis of the resonator, tends to rotate in a direction to close the mouth of the resonator when the latter is stimulated by vibrations or pulsations of proper frequency. The movement of this disk 26 may be utilized as indicated to actuate a switch lever 27, one end of which is operatively connected to the disk 26, while the other end serves to operate a pair of contacts 28 and 29. In this figure the contacts are shown as normally spaced apart but closed by the oscillation of the lever 27. Obviously they could equally well be normally closed, if such an arrangement of the circuit were desired, and the movement of the disk 26 would then serve to part them and thus open the circuit.

I have found that the sensitiveness of the apparatus is affected but little if a hole is cut in the disk, so that the latter has the form of a flat ring, while the tuning is sharper since, as the disk rotates, the mouth of the resonator is closed to a lesser extent by reason of the aperture in the disk. Furthermore, the rotation of the ring is steadier, there is less oscillation and consequently less chattering at the contacts. I have also discovered that there is a tendency for the disk as a whole to move toward the resonator mouth when the disk lies at right angles to the axis of the latter and in front of its mouth. Both of these features are utilized in the construction shown in Figs. 2 and 3.

In this case the resonator 25 has at its mouth a plate 30 provided centrally with a beveled aperture 31 having a sharp outer lip. In front of this aperture 31 the disk 32 is carried by a shaft 33 pivoted in jeweled bearings 34, on plate 30. The disk 32 is of greater diameter than the aperture 31 but has a central hole 35 of less diameter than said aperture. An arm 36 on shaft 33 bears against the spring contact 37 and serves to press it down into engagement with coöperating contact 38 when the disk 32 is actuated inward by the excitation of the resonator 25. The movement of the disk 32 may be limited if desired by a pair of adjustable stop screws 39 and 40 between the heads of which the disk is confined with lost motion.

Another modification is shown in Figs. 4 and 5 based upon my discovery that when a telephone receiver is actuated by alternating current, the diaphragm actually blows outward a current of air, consequently a movable disk arranged in front of the diaphragm will be displaced and this motion may be utilized to control an electric circuit. Thus the telephone receiver, diagrammatically indicated at 41, has in front of its aperture 42, a disk 43 carried by a shaft 44 mounted in jeweled bearings 45. The shaft 44 carries a lever 46 which bears against the spring terminal 47 and, on the outward swing of the disk 43, presses said terminal into engagement with the coöperating terminal 48. The play of the disk may be limited by set screws 39 and 40 as in the construction shown in Figs. 2 and 3.

In Figs. 6, 7 and 8 I have shown a resonator switch of still another construction and in which great delicacy of adjustment and sensitiveness of response are attained. The neck of the resonator is indicated at 25. In front of its mouth is arranged a centrally perforated disk 49 carried by shaft 50 pivoted by capped jeweled bearings 51. On shaft 50 is mounted a crank pin 52, preferably a roller jewel carried by a wheel 53, and bearing against the end of the long arm 54 of a lever carried by shaft 55 mounted in jeweled bearings 56. A crank pin 57 carried by wheel 58 bears against the spring contact arm 59 which lies between the coöperating contact arms 60 and 61, and normally in engagement with one of the same, viz., 61, as shown. When the resonator 25 is excited, the disk 49 rotates, thus actuating the lever 54 and pressing the switch arm 59 out of contact with contact 61 and into engagement with 60.

The adjustments of the arms 60 and 61 with relation to 59 may be very delicately attained by the use of adjusting screws 62 and 63 bearing against lugs 64 and 65 struck outward from the bodies of the contact arms.

To permit of ready change of the contacts, in case of need, the arms 59, 60 and 61 may be mounted on a plate 66 having a slot 67 fitting over bolt 68 and a second slot 69 receiving the hinge bolt 70. The latter affords means for delicately adjusting the contact arm 59 on the crank pin 57 since the plate 66 has a reduced area 71 at which it may be bent by screwing down the nut 72 on the bolt.

Electrical connection to the arms 59, 60 and 61 is effected through the spring wire terminals 73 which engage the short ends of the levers projecting beyond their insulating mounting 74.

While the mounting is as a whole so delicate that the resiliency of the contact arms 59, 60 and 61 may be depended upon to maintain the parts in normal position, light coil springs may be used, if desired, acting on the shafts 50 and 55 to return the parts to position after actuation by the resonator.

The construction shown in Figs. 9 and 10 is like that of Figs. 2 and 3 in that the disk 75 is pivotally mounted as at 76 in front of the mouth of the resonator 25 and moves bodily toward the latter on the excitation of the same. The arm 77 on which the disk is mounted may form one wire terminal 78 while the second terminal 79 lies in the path of the disk as it moves inward, thus completing the circuit. Stops 80, 81, limit the play of the disk. Alternatively, or simultaneously, if desired, the movement of the arm 77 may be utilized to close a circuit between contacts 82 and 83 by moving the latter out of engagement with terminal 84 and into engagement with terminal 83.

The construction of Fig. 11 is the same, this figure being added merely to indicate that a disk 85 with central aperture 86 may be employed in like relation to the resonator 25 as the solid disk 75 of Figs. 9 and 10.

In Fig. 21 I have shown a type of sound producer other than a telephone receiver, and an adjustable resonator. The latter comprises a tubular body having a pair of telescoping parts 87 and 88 which may be adjusted upon one another to tune the same to sound waves of different frequencies. Adjacent one end of the sleeve 87 is arranged the spring sounding reed 89 clamped at its lower end to the upright 90 of the frame 91 and carrying an adjustable slide weight 92. The reed 89 is vibrated by the electromagnet 93. The space between the spring reed 89 and magnet 93 is delicately adjustable through the screw 94 which passes through a tapped hole in the upright 95 and bears at its end against the upright 90 and springs the two uprights apart to effect the adjustment. The magnet and sounding reed may be moved together toward or away from the resonator by sliding the frame 91 on the base 96 to which it is clamped by the screws 97. The sensitiveness of the device may be still further augmented by tuning the electric circuit 98 to the desired frequency by means of an inductance 99 and capacity 100.

The remaining views illustrate diagrammatically various telegraphic systems in which my invention is illustratively embodied. Thus in Fig. 12 I have indicated how by the use of such a resonator switch, I may impose upon an ordinary direct current telegraph system a series of alternating currents which may be controlled in the ordinary manner of telegraphic circuits and by which signals may be received at several distinct receiving stations. Thus from the ground connection 101 an ordinary telegraphic circuit passes through the battery 102, telegraph key 103, relay or sounder 104 and similar apparatus 107, 108, 109 and 110 at the other end of the line. If now coils 105, 126, and 106 be inserted into the line, means are afforded which, while having low resistance to direct current, have a high impedance to the alternating current to be used. These coils consequently have no practical effect upon the direct current passing between the batteries 102 and 109, but will act as an open circuit for the alternating current generated at 114. This alternating current will pass through telephone receiver 112, condenser 111 and out onto the line until it reaches the coil 126. The latter acting as an open circuit, the alternating current will be shunted from the main line through condenser 132, key 127, receiver 128 and back onto the main line. When it reaches coil 106 it is again shunted through condenser 119, receiver 120, key 124, ground connection 125, to ground connection 116, key 115 and to the generator 114 again. Thus we have a circuit with three alternating current stations independent of the direct current telegraph and operated as follows:—

Assuming that the generator 114 produces an alternating current of 500 cycles and that the resonators 113, 129 and 121 are tuned to 500 cycles. Then as long as the keys 115, 127 and 124 are closed and the generator 114 is running, the telephone receivers 112, 128, and 120 will produce sound waves which actuate the resonators and close their local circuits from batteries 117, 130 and 122 through sounders 118, 131 and 123 respectively. If the operator at key 115 wishes to call the operator at 124 he opens his key and calls in the regular manner of hand-telegraphy which simply interrupts the flow of current from generator 114 and hence interrupts the production of the sound at the three stations, with the result that the resonators 113, 129 and 121 open the local circuits from the batteries 117, 130 and 122 nearly in unison with the operation of the key 115. Any one of the stations could signal the others and there could be any number of stations and any length of line, the only limit being that of power produced by the generator 114 and the constants of the line and instruments.

In Fig. 13 I have shown various methods of connecting the sources of alternating current to the line when it is desired to transmit simultaneously a large number of messages. A transformer 133 is here shown having a number of primary coils 134 for receiving alternating current from the several generators 135 of different frequencies and a single secondary coil 136 connected to the line 137. The generators may be of any of the well known types for generating high frequency alternating currents, either of the type involving mass motion of parts such as a rotating armature, or the kind involving molecular motion such as the mercury arc, Poulsen arc, audion, etc. A telegraph key 138, a transformer 139, a condenser 140, and an inductance 141 are variously arranged in the different generator circuits. When the keys are closed there will be impressed upon the line in the present case five different alternating electromotive forces, but it is to be understood that I do not limit myself to any particular number. As the different keys 138 are operated in the regular manner it is evident that different alternating currents would be impressed upon the line according to the operation of the respective keys, each independently of the other.

In Fig. 14 I have shown the generators 135 permanently connected to the line 142 and respectively producing, for example, alternating currents of the frequencies 300, 400, 500 and 600. Assuming that the circuits operated by the keys 143, 144, 145, and 146 are electrically tuned respectively to frequencies of 300, 400, 500 and 600, then since all these circuits are in parallel they will act as a closed circuit to all the frequencies and should any key be opened, say number 145, it would be equivalent to opening the circuit for the frequency of say 500 cycles, and if the key is operated in a telegraphic manner, signals will be sent over the line by the current of this frequency.

If it is desired to operate rapidly, the sending keys may be replaced by an automatic despatcher such as shown in Fig. 15 and having a group of perforated tapes 147 passing over wheels 148 mounted on a shaft 149, operated by gears 150 and 151 and a driving rotor 152. The spring contact brushes 153 are in constant engagement with the sides of the wheels 148, while the contact brushes 154 rest upon the tapes 147 and contact with the wheel only when permitted to do so by perforations 155 therein. In this way a number of different messages may be simultaneously sent at great speed.

In Fig. 16 I have shown a receiving station having some of the devices which may be employed in a system embodying my invention. The alternating currents at various frequencies and at pulsations of different length (depending upon the operations of the despatcher) arrive over the line 156 and energize the sound producers—here indicated as telephone receivers. The receiver 157 is arranged to coöperate with a group of resonators 158, which may be variously tuned to different frequencies or similarly tuned to a single frequency to operate in unison. Each of the remaining sound-producers of the station excites a particular resonator. It will be understood of course that a suitable receiving apparatus, such for instance as a sounder, is arranged in each of the circuits 159 controlled by the resonator switches.

At the left of this figure is shown a telephone receiver 160 of the head type, which delivers its sound waves to a spherical resonator 161 having a small rear opening. The resonator switch closes the circuit from battery 162 operating relay 163 which in turn closes the circuit from battery 164 in which is arranged the sounder 165.

The adjacent receiver 166 coöperates with a spherical resonator 167 having only a front opening and controlling a resonator switch arranged in the circuit from battery 168, which in turn operates the magnet 169 controlling a printing lever 170 operating upon a tape 171.

The next receiver 172 coöperates with a resonator 173 of cylindrical form having at its closed end a tightly fitting piston 174 with spherical front which may be adjusted by the piston rod 175 to vary the frequency of the resonator. This may be graphically indicated by a pointer 176 on the rod which works along a scale 177. In this resonator the distance from the resonator disk 178 to the piston is one-quarter wave length of the sound used or any odd number of quarter wave lengths.

The telephone receiver 179 coöperates with a resonator 180 in which the opening is a half wave length from the disk 181, and the latter is a quarter of a wave length from the closed end of the resonator. In this position the resonator is actuated only when it responds to its first overtone.

At 182 I have shown a resonator tube 183 having one end closed by the telephone receiver diaphragm, while the resonator switch disk 184 is arranged at the opposite end of the tube. In this case a resonator acts as an open tube, the telephone receiver diaphragm forming one crest and the resonator switch disk being at the other crest at the open end of the tube, the length of the latter being equal to a half wave length of the sound used. In this case instead of closing the electric circuit by means of the resonator disk, I have utilized it to reflect a beam of light from a source 185 through a lens 186 and onto a light sensitive film 187 wound on the reel 188. The oscillations of the disk produce an undulating record 187$^a$ on the film and the undulations correspond to the movement of the disk 184 which is of course controlled by the sound waves produced at the receiver 183. Upon photographic development of the film 187, the record 187$^a$ is apparent.

The receiver 189 is connected to the line through the inductance 190 and capacity 191, the values of which are such as to produce a resonant circuit at the desired frequency. Resonator tube 192 is again half a wave length in size, but the front end is partially closed by an iris diaphragm 193 of the construction commonly found in cameras. Since the pitch of the resonator depends upon the opening of this diaphragm it is evident that it may be varied by the lever 194 which thus gives a ready means for tuning the resonator to any desired frequency. Attached to the resonator disk 195 is a marker 196 which bears upon the tape 197 which is reeled upon the drum 198 in like manner as the film just described. In this case the record 199 is mechanically inscribed upon the tape.

The currents employed may be amplified in a manner similar to that employed for telephone currents and in general obey the same laws as telephone currents. Consequently hey may be sent over phantom circuits as ell as over physical circuits. There is the advantage, however, that slight irregular noises which are so detrimental to telephone currents have no effect on these telegraph currents unless they are of sufficiently regular frequency to be classed with musical notes, and hence the telephone circuits may also be operated over grounded circuits as well as over metallic circuits.

In Fig. 17 I have shown how currents coming in from a line 200 may be passed through suitable transformers 201, an amplifying device 202, and thence to wireless antenna 203. Passing across space the signals are received by the antenna 204, again amplified by the telephone repeater 205 and sent into the sound-producing device 206 whereby the different sounds actuate the resonators 207 and 208 to operate the local circuits 209 and 210 in which may be arranged any suitable receiving devices (not shown).

Fig. 18 indicates diagrammatically an arrangement differing in detail from that shown in Fig. 16, but permitting a combination of various stations. Thus 211 and 212 indicate a pair of alternating current generators furnishing electromotive forces of different periodicities to the line 213 through transformers 214 and 215, the generator circuits being properly tuned for resonance by the condensers 216 and 217 and the inductance 218. A plurality of inductances 219, 220, capacities 221, 222, and operating keys 223, 224 for the various alternating electromotive forces are provided and correspond substantially to those described with relation to Fig. 14, while reference 225, 226 and 227 indicate a receiving station similar to that described in connection with Fig. 16. Transformers 228 and repeater 229 are indicated in the line before it reaches the grounded circuit, one end being grounded at 230. Receiving and sending stations 231 and 232 respectively are arranged in one wire line, the other ground being arranged at 233. A repeating station 234 is provided and may be of any of the well known types for repeating telephone currents and it should be understood that it is a two-way repeater, viz., it transmits and amplifies currents in either direction. The line next passes to a submarine cable 235, the circuit being completed through the grounds 236 and 237. Telephone jacks 238 and 239, arranged in series with their respective circuits tuned by condensers 240 and 241 and inductances 242, 243, are provided to make temporary connection when desired, with the receptacles. 244 and 245 arranged in the main circuit. This combination represents a station such as a country or isolated station where it is necessary occasionally to use one or another of the plurality of circuits for transmitting and receiving messages. By plugging any of the jacks 238 into its appropriate receptacle 244, the telephone receiver 246 will respond most loudly to the frequency for which that circuit is tuned and messages may be read by sounds in the receiver and sent by the key 247. On the other hand, by using plug 239 a circuit may be connected in which is arranged a key 248, receiver 249, the latter actuating the resonator 250 which in turn operates the sounder 251 in local circuit 252.

Various other arrangements and combinations of stations will readily occur to those skilled in the art.

I claim as my invention:—

1. In an electric transmission system, a tunable sound resonator, an element mounted to move bodily in the direction of air currents associated with said resonator when said resonator responds to sounds, and electric contacts operated by said element.

2. A resonator responsive to sound, a member near the mouth of said resonator hinged so it may have a curvilinear motion, electrical contacts associated with said member, said electrical contacts being operated only by the motion of said members when said resonator responds to sound.

In testimony whereof I have signed my name to this specification, in the presence of two subscribing witnesses.

HERBERT G. DORSEY.

Witnesses:
 FRED A. SHACKELFORD,
 CLAYTON W. SPINNEY.